3,096,296
POLYETHERS FROM OXYGEN-CONTAINING
ORGANIC COMPOUNDS
Gunther Nischk, Leverkusen, Hans Holtschmidt, Cologne-Stammheim, Wilhelm Bongard, Cologne-Nippes, and Otto Bayer, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Mar. 31, 1958, Ser. No. 724,840
Claims priority, application Germany Apr. 5, 1957
7 Claims. (Cl. 260—2)

This invention relates generally to the preparation of polyethers and more particularly to an improved process for making polyether compounds.

Polyethers having terminal hydroxyl groups are old in the art. They may be obtained for example by polymerization of suitable monomeric cyclic ethers such as, for example, ethylene oxide, propylene oxide, trimethylene oxide, or tetrahydrofuran, under the influence of suitable catalysts. The polyethers may also be prepared by oxalkylation of polyhydric alcohols with alkylene oxides. However, attempts to condense polyhydric alcohols with one another in a condensation reaction analogous to esterification in order to produce polyethers of high molecular weight have so far not been successful. Prior attempts to condense polyhydric alcohols together to produce polyethers resulted in very little condensation and generally water was either split off and a ring structure was formed or there was an intra molecular water cleavage with the formation of double bonds.

It is therefore an object of this invention to provide an improved process for making polyether compounds. Another object is to provide a new and novel method for making high molecular weight polyether compounds. A more specific object of the invention is to provide a method for making polyether compounds of high molecular weight by condensation of polyhydroxy compounds.

Generally speaking the foregoing objects and others are accomplished in accordance with this invention by providing a method wherein an unsaturated polyhydroxy compound having the formula

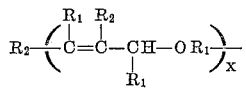

or

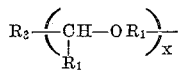

in which $R_1$ represents hydrogen, an alkyl or an aromatic radical, $R_2$ represents an aromatic, a cycloaliphatic or an aliphatic radical, $R_3$ represents an aromatic radical, and X is an integer of from 2 to 6, is reacted with other organic hydroxy compounds in the presence of an acid catalyst.

In reacting the unsaturated polyhydroxy compounds or their ethers of the above type formula with other organic hydroxy compounds, it is important that the group $\{CHR_1—OR_1\}$ be attached to a carbon atom bearing a double bond. It is immaterial whether this double bond is an aliphatic or an aromatic double bond. Thus $R_3$ may be a benzene radical or any other aromatic radical, such as, for example, naphthalene, diphenyl ether, furan or thiophene. Aliphatic radicals having an $\alpha,\beta$ unsaturated group, such as, butadiene may likewise be used in the present process.

The unsaturated polyhydroxy compounds may be reacted as either the free hydroxy group containing compounds or as the ether of the free hydroxy group containing compounds as, for example, the methyl ether of the unsaturated polyhydroxy compound. These unsaturated polyhydroxy compounds or their ethers are condensed according to the present invention with other dihydric and polyhydric alcohols which may or may not have the same structure as that of the unsaturated polyhydroxy compounds. The unsaturated polyhydroxy and organic polyhydroxy compounds are heated in the presence of a small amount, preferably about 0.01% to about 1%, of any suitable acid catalyst which splits off water from the hydroxyl groups of the polyhydroxy compounds and the unsaturated polyhydroxy compounds to form ether linkages joining the two components together. If unsaturated polyhydroxy ethers are used in place of the unsaturated polyhydroxy compounds, alcohols are split off in place of water in the condensation reaction. Examples of such acid catalysts are, for example, p-toluene sulphonic acid, p-toluene sulphonic acid esters, benzene sulphonic acid, benzene sulphonic acid esters, phosphoric acids and their esters, and acid-treated bleaching earths, for instance acidic montmorillonites. If unsaturated polyhydroxy compounds having free hydroxyl groups, are used, water is split off during the condensation reaction which is removed from the reaction mixture by heating to a temperature of from about 140° C. to about 200° C. After condensing at this temperature the condensation is completed by applying a vacuum to the reaction mixture whereby the remaining water liberated during the condensation reaction is removed.

Solvents for organic polyhydroxy compounds may be used in the condensation reaction, but in most cases the use of a solvent is not needed. If a solvent is used, a solvent having a boiling point higher than water is necessary such as methyl naphthalene, decalin and diphenyl ether. The preferred boiling range for the solvent is from above 100° C. to about 200° C. After the removal of the water the polyether compounds prepared according to the invention are reasonably pure and do not normally require a separate purifying process.

The polyether compounds produced by the invention may contain terminal hydroxyl groups and by a suitable choice of the components it is also possible to prepare either straight chain or branched chained polyether compounds. The degree of branching of such polyether compounds can be varied by using mixtures of monohydric, dihydric or trihydric alcohols or an alcohol containing more than three hydroxyl groups. The polyether compounds produced by the invention have a molecular weight of from about 300 to about 10,000. The molecular weight may be varied by using an excess of polyalcohols such as, for example, hexanediol or diethylene glycol which by themselves do not condense with each other and because of this produce lower molecular weight compounds. It is also possible to admix polyhydric alcohols or their ethers for the condensation reaction. Examples of such compounds which may be admixed are benzyl alcohol, hydroxymethyl naphthalene, dodecyl alcohol or dibenzyl ether. Therefore the selection of the alcoholic compounds to be condensed with the unsaturated polyhydroxy compounds determine the molecular weight of the polyether compounds produced by the invention. As already mentioned above, the hydroxyl terminated unsaturated polyhydroxy compounds may be used to prepare polyether compounds having terminal hydroxyl groups. An excess of the unsaturated polyhydroxyether may also be used to produce polyether compounds having terminal ether groups. Also it is possible to use monohydric alcohols to condense with the unsaturated polyhydroxy compounds to prepare compounds having neither terminal hydroxyl nor terminal ether groups.

The present invention, therefore, makes it possible for polyether compounds to be prepared within an extremely short period of time. Such polyethers have a high degree of purity for technical purposes and are obtainable in very good yields.

The unsaturated polyhydroxy compounds used in the present invention may be prepared by the degradation of condensation products of aromatic hydrocarbons and formaldehyde. The condensation products of aromatic hydrocarbons and formaldehyde are well known, see for example, Angew. Chemie 1948, pages 88–96. The term "condensation products of aromatic hydrocarbons" also covers the condensation products of phenyl ethers, such as, for example, the condensation product of anisol and formaldehyde. The aromatic constituents of the condensation products are connected to one another by alkylene, benzyl acetal and dibenzyl ether groups. The condensation products may be degraded at elevated temperatures in the presence of acid catalysts or monofunctional, low molecular weight alcohols, such as, for example, methanol.

In the degradation reaction, the splitting off of the acetal groups, forms dialkyl acetals with the aldehydes that are liberated, and benzyl alkyl ethers are formed from the benzyl alcohols which are liberated. The dibenzyl ether groups are also split off and are converted into benzyl alkyl ethers. After degradation has taken place, it is advisable to separate out the dialkyl acetals from the reaction mixture such as, for example, by distillation which may be carried out under vacuum.

Any suitable catalyst may be used for the degradation reaction. Examples of such catalysts are acid reacting substances which accelerate the formation of the acetal group, such as, for example, hydrochloric acid, sulphuric acid, phosphoric acid and other mineral acids, organic sulphonic acids, their esters and chlorides, boron fluorides, sulphur dioxide or the like. The degradation may be carried out, for example, in a stirrer-type vessel. A pressure-type vessel may also be used for the degradation process. Temperatures of from about 70° C. to about 180° C. are particularly suitable for the degradation reaction. If methanol is used for the degradation reaction, the degree of degradation may be determined by finding the methoxy group and total oxygen content of the reaction product. For example, a product degraded at about 70° C. having an oxygen content of 9.7% has a methoxy group content of 5.1% corresponding to 2.6% of oxygen. Consequently, there remains a residual oxygen content of 7.1%, of which 4.6% is present in the form of free hydroxyl groups and the remaining 2.5% probably exist in the form of benzyl ether. With a degradation temperature of 100° C. the residual oxygen content falls to 3.1%. The residual oxygen content falls to 1.4% at a degradation temperature of 120° C. and to 0.6% at a degradation temperature of 150° C. The products no longer contain any free hydroxy groups. As shown from the total oxygen content, about 9.3% to about 8.7% of the oxygen present is in the form of methoxy groups. Corresponding to the increased degree of splitting which occurs as the degradation temperature rises, the molecular weight of the degradation products falls from about 410 at 70° C. to about 260 at 150° C.

Any other suitable unsaturated polyhydroxy compound may be used in the invention in place of the degradation products of aromatic hydrocarbons and formaldehyde. Examples of such unsaturated polyhydroxy compounds and their ethers which may be used for the present process are p-xylene glycol, o-xylylene glycol, 1,3,4-trimethanol benzene, 1,3-dimethyl-4,6-xylylene glycol, 1,5-bis-hydroxy methyl naphthalene, 4,4'-bis-hydroxy methyl diphenyl ether, 1,4-bis-hydroxy methyl thiophene and heptadiene (2,5)-di-1,7-ol and the like. The ethers of the above unsaturated polyhydroxy compounds may also be used in the condensation as, for example, the methyl, ethyl, propyl and allyl ethers, and more specifically, the p-xylene glycol dimethyl ether or the 1,4-(butene-2)-dimethyl ether or the like.

The unsaturated polyhydroxy compounds or their corresponding ethers may be condensed with any suitable dihydric or polyhydric, aliphatic, cycloaliphatic or aromatic alcohol to produce the polyether compounds. Examples of such dihydric and polyhydric alcohols which may be used in the condensation are diethylene glycol, triethylene glycol, 1,5-pentanediol, 1,6-hexanediol, pentachlorophenyl glycerine ether, trimethylol propane, glycerine, pentaerythritol, the di-β-hydroxyethyl ethers of 4,4'-dihydroxy-diphenyl dimethyl methane, of 1,5-dihydroxy naphthalene and of hydroquinone, tripropane monoallyl or diallyl ethers, hydroquinone and dihydroxy diphenyl dimethyl methane or the like. Polyhydroxy compounds which are already of higher molecular weight, such as, for example, polypropylene oxide and polytetrahydrofuran, hydroxyl polyesters, partially saponified polyvinyl acetate and hydroxyethylated phenolformaldehyde resins or the like may also be condensed with the unsaturated polyhydroxy compounds.

The polyethers obtained by the present invention are of importance as plasticisers for plastics and may also be used as starting materials for the manufacture of highly cross-linked plastics by reaction with polyisocyanates to form polyurethanes which in turn may be used for carpet underlay, automobile tires or the like.

In order to better describe and further clarify the invention, the following are specific embodiments thereof:

*Example 1*

About 1000 parts by weight of a synthetic resin consisting of xylene and formaldehyde are heated with about 800 parts by weight of methyl alcohol and about 5 parts by weight of p-toluene sulphonic acid in a refined steel stirrer-type autoclave for about 10 hours at about 180° C. After cooling, the reaction mixture consisting of two layers is liberated under reduced pressure form the low-boiling constituents and then the p-toluene sulphonic acid is separated out and filtered with suction on a suction filter capable of being heated. About 800–900 parts by weight of the degradation product are obtained in the form of a liquid of light viscosity having an oxygen content of 9.3% and a methoxy content of 16.85% and having a molecular weight of 260.

300 parts by weight of this degradation product are then added to about 220 parts by weight of trimethylol propane and about 0.5 part by weight of p-toluene sulphonic acid and heated from about 160° to about 165° C. in a nitrogen atmosphere with stirring. Methanol is split off violently at a temperature of about 155° C. When the distillation temperature falls to about 50° C., the condensation is carried out for another 2 hours under reduced pressure. A brownish resin is obtained having an OH number of 380.

If, however, only 190 parts by weight of trimethylol propane are used instead of 220 parts by weight, the result is a resin having an OH number of 320.

*Example 2*

A degradation product of a xylene-formaldehyde synthetic resin which is prepared according to Example 1 but with a degradation temperature of 100° C. is heated in a carbon dioxide atmosphere with about 220 parts by weight of trimethylol propane and about 0.5 part by weight of p-toluene sulphonic acid with stirring. Methanol and water start to split off violently at a temperature of about 155° C. When the temperature at which the water and methanol split off falls to about 80° C. the condensation is continued for about another two hours in vacuo. The result is a yellowish-brown resin having an OH number of about 320.

Example 3

300 parts by weight of a degradation product of a xylene-formaldehyde synthetic resin which is prepared according to Example 1 are heated with about 140 parts by weight of trimethylol propane, 100 parts of weight of butane dihydroxyethyl glycol and about 0.5 part by weight of p-toluene sulphonic acid with stirring and while passing over nitrogen gas. As the temperature reaches about 155° C. methanol starts to split off violently. The internal temperature is raised to about 165° C. and kept at this temperature until the transition temperature of the methanol split off has fallen to about 50° C. Condensation is carried out for another two hours in vacuo and a yellowish-brown resin is obtained having an OH number of about 310.

Example 4

300 parts by weight of the degradation product according to Example 1 are heated with about 100 parts by weight of trimethylol propane, about 130 parts by weight of hexanediol-1,6 and about 0.5 part by weight of p-toluene sulphonic acid. When methanol no longer splits off in the reaction mixture, the condensation is carried out for another two hours in vacuo. The result is a yellow polyether having an OH number of about 305.

Example 5

300 parts by weight of a xylene-formaldehyde synthetic resin are degraded at a temperature of about 120° C. with methanol. The degradation product is heated from about 160–165° C. while stirring with about 100 parts by weight of trimethylol propane, about 10 parts by weight of 1,4-butylene glycol and about 0.5 part by weight of p-toluene sulphonic acid. Methanol starts to split off violently at a temperature above 160° C. When the transition temperature of the methanol has fallen to about 50° C., the condensation is carried out for another two hours in vacuo. The result is a yellowish brown polyether having an OH number of about 260.

Example 6

840 parts by weight of 1,3-dimethyl-4,6-dichloromethyl benzene are dissolved in 1200 parts by volume of methanol. About 720 parts by weight of a 48% caustic soda solution are then added dropwise at a temperature of about 65° C. with stirring. The temperature of the reaction mixture rises rapidly to about 70° C. When all of the caustic soda solution has been added, stirring is continued for an additional 2 hours with boiling. The reaction mixture is then diluted with about 2 liters of water and the oil that separates out is washed until neutral. After drying the oil, there is obtained about 780 parts by weight of 1,3-dimethyl-4,6-xylylene glycol dimethyl ether as a light yellow fluid. The dimethyl ether is formed in a state pure enough to be used without further purification for the production of the polyether referred to in Example 7.

Example 7

About 585 parts by weight (3 mol) of 1,3-dimethyl-4,6-xylylene glycol dimethyl ether, about 450 parts by weight (3 mols) of triethylene glycol and about 134 parts by weight (1 mol) of trimethylol propane are mixed in the presence of one part by weight of p-toluene-sulphonic acid and the temperature is then raised to about 170° C. while passing over carbon dioxide and stirring. Methanol is split off violently at a temperature of about 165° C. When the temperature of the transition thermometer on the column falls to about 58° C., vacuum is gradually applied at this temperature (170° C.) until a vacuum of about 25 mm. is reached. The transetherification is stopped after about 2 hours and a light yellow oil is obtained which is viscous at room temperature. The polyether which is produced has about 5.3% of —OH groups. The quantity of methanol split off is about 185 parts by weight.

Example 8

About 585 parts by weight (3 mols) of 1,3-dimethyl-4,6-xylylene glycol dimethyl ether, about 300 parts by weight (2 mols) of triethylene glycol and about 268 parts by weight (2 mols) of trimethylol propane are mixed with about 1 part by weight of p-toluene-sulphonic acid methyl ester then heated in a current of nitrogen to a temperature of about 170° C. with stirring. The methanol starts splitting off violently from a temperature of about 168° C. When the temperature of the transition thermometer on the column falls to 58° C., vacuum is then gradually applied until about 20 mm. of mercury is reached. After about 2 hours, the transetherification is stopped and a light yellow oil is obtained which is viscous at room temperature. The polyether which is produced has about 5.3% of —OH groups. The quantity of methanol split off during the condensation is about 185 parts by weight.

Example 9

About 585 parts by weight of 1,3-dimethyl-4,6-xylylene glycol dimethyl ether (3 mols) and about 536 parts by weight (4 mols) of trimethylol propane are mixed with about 1 part by weight of p-toluene-sulphonic acid and condensed in a current of nitrogen as described in Example 8. After the transition temperature has fallen to about 58° C., the final condensation is carried out in vacuo at about 175° C. with methanol being split off. A yellow branched polyether which is very viscous at room temperature is obtained. The polyether has an hydroxyl number of about 370, which equals about 11.1% of —OH groups. The quantity of methanol split off during the condensation amounts to about 190 parts by weight.

Example 10

About 230 parts by weight (1 mol) of 4,4'-diphenyl-oxide dimethyl ether

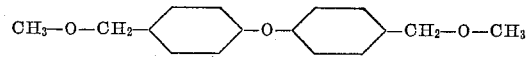

and about 210 parts by weight (1.2 mols) of 4,4'-butane-dihydroxy ethyl ether are mixed with about 0.4 part by weight of p-toluene-sulphonic acid and heated to about 170° C. with stirring and while passing over carbon dioxide. Methanol is then split off violently at this temperature. As the splitting off of methanol subsides vacuum is gradually applied until about 20 mm. of mercury is reached. Reaction is then carried out by heating for an additional 2½ hours at this reduced pressure and at a temperature of from about 175 to about 180° C. After cooling, a brownish yellow linear polyether is obtained having an hydroxyl number of about 65.

The 4,4'-diphenyloxide dimethyl ether is prepared in a manner analogous to the preparation of 1,3 dimethyl-4,6-xylylene glycol dimethyl ether in Example 6.

Example 11

About 690 parts by weight (3 mols) of 4,4'-diphenyl-oxide dimethyl ether and about 236 parts by weight (2 mols) of hexanediol-1,6 are heated to about 175° C. with the addition of about 0.7 part by weight of p-toluene sulphonic acid according to Example 7 and while passing over carbon dioxide and stirring. Methanol is split violently at this temperature and when this reaction subsides, vacuum is gradually applied until about 20 mm. of mercury is reached. The condensation is stopped after about 2½ hours and a gradually solidifying yellow polyether having terminal methoxy groups is obtained at room temperature.

Example 12

About 414 parts by weight (3 mols) of p-xylylene glycol, about 300 parts by weight (2 mols) of triethylene glycol and about 268 parts by weight (2 mols) of trimethylol propane are mixed with about 3 parts by weight of p-toluene sulphonic acid and the reaction mixture is then heated to about 190° C. with stirring and while passing over nitrogen. Water begins to be split off at a temperature of about 170° C. When the temperature of the transition thermometer on the column falls to 90° C., vacuum is then applied until about 20 mm. is reached. The etherification is stopped after about 5 hours and a yellowish brown polyether is obtained which is viscous at room temperature. The hydroxyl content of the polyether is 8.2% corresponding to an hydroxyl number of 270.

*Example 13*

About 528 parts by weight (3 mols) of 1,3-dimethyl-4,6-xylylene glycol, about 528 parts by weight (3 mols) of butane dihydroxy ethyl ether and about 134 parts by weight (1 mol) of trimethylol propane are heated with about 3.9 parts by weight of p-toluene sulphonic acid to a temperature of about 195° C. with stirring and while passing over nitrogen. Water starts to be split off at a temperature of about 175° C. When the temperature of the transition thermometer on the column falls to about 90° C., vacuum is then applied until about 20 mm. of mercury is reached. Heating is then continued for about 5 hours at this temperature and reduced pressure. After cooling, a brownish-yellow polyether with an hydroxyl number of about 290 is obtained. The polyether is viscous at room temperature.

*Example 14*

About 330 parts by weight of 1,4-diallyl hydroxy butene-2 and about 380 parts by weight of butane dihydroxy ethyl glycol ether are mixed in the presence of about 0.5 part by weight of p-toluene sulphonic acid methyl ester and heated to about 160° C. while passing over carbon dioxide. Allyl alcohol is split off violently at this temperature and a brownish-yellow polyether is formed. When the splitting of allyl alcohol subsides, vacuum is gradually applied until approximately 30 mm. of mercury is reached. After about 2½ hours the trans-etherification is stopped and the resultant brownish yellow aliphatic polyether has an hydroxyl number of about 80.

It is to be understood that any of the unsaturated polyhydroxy compounds or polyhydroxy compounds or catalyst disclosed as operable herein can be substituted in the foregoing working examples for those specific compounds used.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

Having thus disclosed the invention we claim:

1. A method for preparing polyether compounds which comprises reacting a compound selected from the group consisting of compounds having the formula:

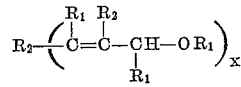

and compounds having the formula:

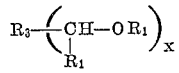

wherein $R_1$ represents a member of the group consisting of hydrogen, and alkyl radicals, $R_2$ represents a member of the group consisting of aliphatic, and aromatic radicals, $R_3$ represents an aromatic radical, and X is an integer of from 2 to 6, with an aliphatic polyhydric alcohol wherein the only OH groups present are the alcoholic hydroxyl groups in the presence of an acid catalyst.

2. A method for preparing polyether compounds which comprises reacting a polyhydroxy compound having the formula:

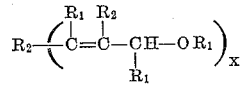

wherein $R_1$ represents a member selected from the group consisting of hydrogen, and alkyl radicals, $R_2$ represents a member of the group consisting of aliphatic, and aromatic radicals, and X represents an integer of from 2 to 6, with an aliphatic polyhydric alcohol wherein the only OH groups present are the alcoholic hydroxyl groups in the presence of an acid catalyst.

3. A method for preparing polyether compounds which comprises reacting a compound having the formula:

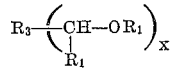

wherein $R_1$ represents a member selected from the group consisting of hydrogen, and alkyl radicals, $R_3$ represents an aromatic radical, and X represents an integer of from 2 to 6, with an aliphatic polyhydric alcohol wherein the only OH groups present are the alcoholic hydroxyl groups in the presence of an acid catalyst.

4. The polyether compound which is produced by reacting a compound selected from the group consisting of compounds having the formula:

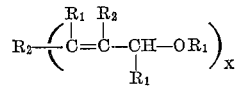

and compounds having the formula:

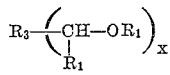

wherein $R_1$ represents a member of the group consisting of hydrogen, and aromatic alkyl and aromatic radicals, $R_2$ represents a member of the group consisting of aliphatic, and aromatic radicals, $R_3$ represents an aromatic radical, and X is an integer of from 2 to 6, with an aliphatic polyhydric alcohol wherein the only OH groups present are the alcoholic hydroxyl groups in the presence of an acid catalyst.

5. The polyether compound which is produced by reacting a polyhydroxy compound having the formula:

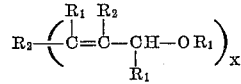

wherein $R_1$ represents a member selected from the group consisting of hydrogen, and alkyl radicals, $R_2$ represents a member of the group consisting of aliphatic, and aromatic radicals and X represents an integer of 2 to 6, with an aliphatic polyhydric alcohol wherein the only OH groups present are the alcoholic hydroxyl groups in the presence of an acid catalyst.

6. The polyether compound which is produced by reacting a compound having the formula:

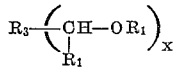

wherein $R_1$ represents a member selected from the group consisting of hydrogen, and alkyl radicals, $R_3$ represents an aromatic radical, and X represents an integer of 2 to 6, with an aliphatic polyhydric alcohol wherein the only OH groups present are the alcoholic hydroxyl groups in the presence of an acid catalyst.

7. The polyhydric polyalkylene ether obtained by condensing 1,3-dimethyl-4,6-xylylene glycol with trimethylol propane in the presence of p-toluene sulphonic acid.

(References on following page)

References Cited in the file of this patent

UNITED STATES PATENTS

| | | |
|---|---|---|
| 2,350,147 | Borglin | May 30, 1944 |
| 2,437,368 | Vance et al. | Mar. 9, 1948 |
| 2,806,834 | Nischk et al. | Sept. 17, 1957 |
| 2,811,491 | Pruitt et al. | Oct. 29, 1957 |
| 2,825,712 | Witzel | Mar. 4, 1958 |
| 2,839,477 | De Groote et al. | Oct. 17, 1958 |
| 2,877,190 | Canterino | Mar. 10, 1959 |

OTHER REFERENCES

Rhoad et al.: J.A.C.S., vol. 72, pages 2216–19 (1950).